United States Patent [19]

Emmons et al.

[11] 4,197,225
[45] Apr. 8, 1980

[54] POLYMER CONCRETE COMPOSITIONS AND CURED PRODUCTS THEREOF

[75] Inventors: William D. Emmons, Huntingdon Valley; Peter R. Sperry, Doylestown, both of Pa.

[73] Assignee: Rohm and Haas Company, Philadelphia, Pa.

[21] Appl. No.: 968,706

[22] Filed: Dec. 12, 1978

Related U.S. Application Data

[63] Continuation-in-part of Ser. No. 687,856, May 19, 1976, abandoned.

[51] Int. Cl.$^2$ ............................ C08K 3/22; C08K 3/24
[52] U.S. Cl. ...................... 260/23 AR; 260/23.7 A; 260/23.7 C; 260/29.6 S; 260/29.7 S; 260/42.13; 260/42.52; 260/42.53
[58] Field of Search .................. 526/282; 260/42.13, 260/42.52, 42.53, 23 AR

[56] References Cited

U.S. PATENT DOCUMENTS

| | | | |
|---|---|---|---|
| 2,414,089 | 1/1947 | Bruson | 260/410.5 |
| 4,071,489 | 1/1978 | Emmons et al. | 526/282 X |
| 4,141,868 | 2/1979 | Emmons et al. | 526/282 X |

FOREIGN PATENT DOCUMENTS 1234027 2/1967 Fed. Rep. of Germany ........... 526/282

OTHER PUBLICATIONS

Chem. Abs. 75:153046t (1971).

Primary Examiner—Sandra M. Person
Attorney, Agent, or Firm—Lester E. Johnson

[57] ABSTRACT

This application concerns compositions comprising a mixture of air-drying dicyclopentenyl acrylate or methacrylate binder and a granular or particulate aggregate material, which may comprise a hydraulic cement, and is adapted to be formed by casting, extruding, or molding in any fashion into any desired shape and air-drying and resulting shaped article, thereby producing an integral, solid article of unitary mass and structure. The dicyclopentenyl (meth)acrylate may be used as an impregnant, polymerizable in situ, for already formed articles of porous nature, e.g., concrete, wood, pressed boards, and powdered pressed metal, such as aluminum, iron, steel, etc., to reduce the permeability at their surfaces and provides hard, continuous, hydrophobic, wear-resistant, and weather-resistant surfaces thereon.

7 Claims, No Drawings

POLYMER CONCRETE COMPOSITIONS AND CURED PRODUCTS THEREOF

RELATED APPLICATION

This application is a continuation-in-part of our copending application Ser. No. 687,856 filed May 19, 1976 and now abandoned.

DESCRIPTION OF THE INVENTION

In accordance with one aspect of the invention, dicyclopentenyl acrylate or methacrylate or a mixture thereof is used as a hard and hydrophobic binder material in various particulate aggregate systems, and in accordance with another aspect is used to impregnate porous material to provide a hardened, hydrophobic, abrasion-resistant, and impact-resistant surface on all sorts of materials, especially on formed articles or formulations whether naturally occurring or artificially produced.

In the description hereinafter, the abbreviation DCP(M)A is intended as a generic term to represent one or the other, or a mixture thereof, of esters of the following formula:

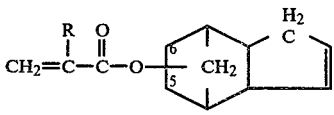

wherein R is H or $CH_3$. The (meth)acryloxy substituent may be on either the 5 or 6 position, the commercial product being a mixture of the two isomers. The respective acrylate or methacrylate of the formula above may also be called:

3a,4,5,6,7,7a-hexahydro-4,7-methanoindenyl acrylate-5 (or 6) or methacrylate-5 (or 6).

The expression DCP(M)A will be used hereinafter as a generic definition of either of these monomers or a mixture thereof. The term DCPA may be used to refer specifically to the acrylate and DCPMA to refer specifically to the methacrylate.

These monomers have low toxicity, low volatility, high flash point, and low shrinkage on polymerization using an air-drier. All of these qualities contribute to the effectiveness of DCP(M)A in polymer concretes (PC) and to the improved qualities of the products obtained as compared to PC made with such common volatile monomers as methyl methacrylate, styrene, etc. The low shrinkage in the cured products from DCP(M)A is particularly outstanding and advantageous.

By the term "drier" herein is meant a siccative, that is, any polyvalent metal containing complex or salt that catalyzes the oxidative curing of drying oils or drying oil modified alkyd resins and, when added to varnishes, paints, etc., hasten the drying or curing. Such substances include the polyvalent metal salts or inorganic acids or lower aliphatic acids such as the chloride, nitrate, borate, sulfate, acetate, acetylacetonate, and propionate when water-solubility is desired, and of higher, aliphatic acids, such as the butyrate, pentanoate, hexoate, and especially the salts of higher aliphatic acids having from 8 to 30 carbon atoms or of naphthenic acids when solubility in organic systems is desired. The oxides of such metals are also useful. Generally, the most useful driers for the DCP(M)A of the present invention are salts of naphthenic acids or of ($C_8$ to $C_{30}$) aliphatic acids. Examples of the polyvalent metal include calcuim, copper[II], zinc[II], manganese[II], manganese[III], lead[II], cobalt[II], cobalt[III], iron[III], vanadium[II], vanadium[III], and zirconium[IV]. Examples of the acid component or anion of the drier salt is that of acetic acid, propionic acid, butyric acid, acetylacetic acid, naphthenic acids, resinic acids, (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abietic acid. The driers mentioned in "Encyclopedia of Chemical Technology," Kirk-Othmer, Volume 5, pages 195–205, published by Interscience Encyclopedia, Inc., N.Y., 1950, may be employed. Frequently, mixtures thereof are used. Preferred drier salts are those of cobalt and manganese, such as cobalt octoate, cobalt naphthenate and manganese octoate and naphthenate.

Aromatic amines may be used in small amounts with the drier and generally accelerate the action of the drier. For example, aniline, N,N-dimethylaniline, N,N-diethylaniline, toluidine, N,N-di(hydroxyethyl)toluidine, may be added for this purpose in an amount of 0.1 to 2% by weight of the DCP(M)A.

The granular or particulate material that is mixed with the DCP(M)A can be any material whether capable of curing or not. Examples of inert materials are pebbles, sand, or other so-called aggregate materials used in the making of concrete. The sand that may be used may be of any quality or of any size, preferably having a diameter of about 1 mm. or less. Graded sand of medium particle size such as "Ottawa" sand and "Best" sand or a mixture of the two may be used to better advantage. Ottawa sand is a silica sand of the type referred to as "round." Best sand is of the type known as "sharp." In both cases, fines will have been removed. In general, however, the sieve size of the sand may vary over a fairly wide range. In lieu of or in addition to sand, it is possible to use ground glass, emery powder, ground slag, fine gravel, trap rock and similar aggregates.

It is often advantageous to incorporate in the mixture, with or without sand, a minor fraction of clay and/or of a hydraulic cement; if so, the clay may take the form of kaolin, china clay, porcelain clay, fire clay, pipe clay, Bentonite, and, in fact, almost any of the known types of clay. Of course, other materials of pebble nature may be employed including broken clay products, marble chips, crushed stone, and other typical aggregate materials used in the making of terrazzo floors or walls. The hydraulic cement that may be employed includes Portland cements of the various types, the white cements, the natural cements, puzzolanic cements, cements derived from industrial slags and "fly ash," aluminous cements, and, in general, all of the commercially available hydraulic cements. Also included are hydraulic limes and similar materials of kinds well known to those skilled in the art.

If desired, a mixture of relatively small-sized particles, such as sands, may be employed with large-sized aggregate, such as pebbles, crushed stone, marble chips and the like in various proportions. Preferably mixed aggregates of graded sizes are used to minimize void volume, especially to achieve void volumes of less than 0.37, optimally less than 0.3 to thereby reduce the amount of monomeric DCP(M)A with or without other non-volatile monomer to minimize the amount of monomer required to fill the voids and thereby minimize the overall polymerization shrinkage and cost of the monomer component. The mixing of different-sized aggregates to accomplish this low void volume fraction can be performed as described in Encyclopedia of Chemical Technology, Kirk-Othmer, Volume 3, pages 466–478, Interscience, 1949. When the DCP(M)A is used as the binder for such inert material, (under anhydrous conditions, any hydraulic cement is properly designated as inert), the proportion of DCP(M)A employed may vary widely depending upon the porosity and surface area of the aggregate to be bound together. For example, the amount of DCP(M)A may be from about 2% by weight to 40% by weight or more of the total weight of hydraulic cement and other aggregate materials to be used in the compositions. In this regard, the clay and/or hydraulic cement under anhydrous conditions may be viewed as an "ultrafine" particle sized aggregate component to further decrease void volume. The resulting composition can be shaped into any form desired. The addition of a drier or siccative in small amounts can be made to the mixture before molding. Alternatively, the molded product can be coated or impregnated with the drier. The proportion of drier added to composition before molding may be from about 0.0005 weight percent up to 2 weight percent based on the weight of the DCP(M)A.

The drier may be kept in a separate package and shipped separately to the site of operations where the composition of the present invention is to be molded or where a porous product is to be impregnated by the DCP(M)A. The drier, if of rapid-acting type, is preferably mixed into the DCP(M)A/aggregate mixture shortly before the casting or molding of the mixture in the form desired.

The composition may be colored by the choice of a colored aggregate or by including within the aggregate or within the composition a suitable amount of pigment or dye dissolved in the DCP(M)A. The amount of such pigmentatious or filler material (other than colored sand, aggregate, clay, or the like) may vary from about 1% to 20% by weight of the composition.

The formation of the composition by molding may be accomplished in any desired way. For example, the mixture comprising the DCP(M)A, drier, and aggregate may be poured into suitable molds as in the casting of concrete or in the casting of cements that may later be used as wall or ceiling tiles or panels. When using it for this purpose, the mixture of DCP(M)A and aggregate may be so proportioned as to provide a trowellable composition. If additional viscosity is needed in such compositions to facilitate trowelling or other forming actions, a thickening agent or rheological control agent may be included. In general, any moderate to high molecular weight resin soluble in the DCP(M)A is useful as a rheological control agent. An example of such agent that is quite compatible and useful with DCP(M)A are the polydicyclopentadienes, commercially available under the registered trademark PICCODIENE ® resins. Besides the dicyclopentadiene oligomers mentioned, other viscous oligomers such as of polybutadiene may be employed.

Besides trowelling and/or casting such compositions, they may be formed by extrusion into rods, bars, or sheets of any suitable cross-section.

The formation may be accomplished at room temperature or at higher temperatures if desired. In any event, the composition with which the present invention is concerned may be completely free of volatile substances so that shrinkage that is difficult to control when other compositions having volatile components are used is avoided.

Choice of a rapid-acting drier to accomplish the oxidation of the binder component consisting of the DCP(M)A and the hydrocarbon resins used as rheological control resins may result in curing to a solid state in a relatively short time such as from 5 to 20 minutes or so. However, curing the surface may require additional drying time to overcome tackiness because of the inhibition of polymerization of the DCP(M)A by free radical action occurring at the air/surface interface. This initial tackiness may be overcome more rapidly by coating of the surface shortly after formation of the composition with a free radical initiator contained in a suitable immiscible liquid that will exclude air from the surface after application thereof thereto.

The compositions described hereinabove are extremely hard when cured. When it is desired to render such compositions more flexible, the DCP(M)A may be used with auxiliary acrylic and/or vinyl ester binder materials which can reduce the hardness and impart a more flexible or resilient character to the final composition. Such other acrylic ester monomers include $(C_8-C_{30})$-alkyl or $(C_8-C_{30})$-alkenyl acrylates or methacrylates such as lauryl acrylate, myristyl acrylate, palmityl acrylate, oleyl acrylate, linoleyl acrylate, linolenyl acrylate, stearyl acrylate; similar improvements in flexibility may be obtained by including with the DCP(M)A long chain $(C_8-C_{30})$ aliphatic acid vinyl esters, e.g., vinyl laurate, vinyl oleate, vinyl stearate or di$(C_3-C_8)$ alkyl esters of maleic acid, fumaric acid, or itaconic acid, e.g., the dipropyl, dibutyl, or dihexyl fumarate, maleate, or itaconate. The DCP(M)A may also be used with small proportions of multifunctional, i.e., polyethylenically unsaturated monomers, such as allyl (meth)acrylate, polyol poly(meth) acrylate, such as ethylene glycol diacrylate or dimethacrylate, trimethylolpropane triacrylate or trimethacrylate, etc. All of these monomeric materials have low volatility and are polymerizable either by the action of the siccative or by free radical polymerization to form products having greater toughness and resistance to water solvents, acids, and alkali. The proportion of these auxiliary monomers may be from about ½% to 60% by weight of the DCP(M)A component, but preferably not over about 40% by weight of such component.

When using the DCP(M)A as the binder for inert aggregate material in conjunction with cementitious materials, such as hydraulic cements, (the hydraulic cement constituting a portion of the aggregate under anhydrous conditions), the DCP(M)A may be mixed in with the aggregate comprising the cement in sufficient proportion to render the anhydrous mixture trowellable or having adequate viscosity or plasticity to allow formation by extrusion, casting, or molding. The relative proportions between (1) hydraulic cement and (2) other aggregate material in compositions containing both (1) and (2) may be from 1:100 to 10:1, and is preferably from 1:20 to 3:1.

On the other hand, a small amount of water may be emulsified into the mixture using an emulsifying agent if desired. In this instance, the setting of the cementitious component may depend to some extent upon the content of moisture in the mixture as it is formed and/or permeability of the formed product to a moist embient atmosphere although hydraulic action in setting the compositions of the invention is not vital. As stated previously, color may be imparted by use of pigment or a colored component of the aggregate, such as colored marble chips, colored fractured glass marbles, and the like. Alternatively, a dye for the DCP(M)A may be used or the clay or cement component of the aggregate may be chosen to contribute to the color of the system.

The DCP(M)A as a binder for cementitious material containing hydraulic cement with or without other aggregate in the form of sand, pebbles, and the like, may be used in the making of all sorts of formed articles, such as concrete, basements, terrazzo floors, wall and ceiling panels, pavements for roads and bridges, ship floors or decks, and also coatings for steel tanks. An example of the use of a composition containing the DCP(M)A binder and hydraulic cement without aggregate is in the preparation of mortars or grouts to bind stones, cinder blocks, concrete blocks, bricks, and the like, to form floors, walls, etc. In all such structures, the cured product is resistant to water, abrasion, and corrosive media such as acids and alkalies.

The invention also contemplates the impregnation of already formed articles having a porous surface with DCP(M)A and a drier (which may also contain (1) long chain (meth)acrylates, vinyl esters, or dialkyl fumarates, maleates, or itaconates to impart softening, toughness, and flexibility and/or (2) multifunctional monomeric materials, e.g., glycol dimethacrylate for additional crosslinking and improved water-, solvent-, acid-, and alkali-resistant properties) to penetrate at least the outer pores of the surface of such porous articles to harden the surface and make it resistant to penetration by such liquids as water, organic solvent materials, acids, alkalies, and other corrosive liquids. Examples of porous-surfaced materials include concrete, stone masonry or brick walls including the facings of the mortar between the bricks and the stones, weathered archeological artifacts and wall structures, weathered granite and marble walks and sculptures previously formed and hardened floors, walls, and ceilings, whether formed of plaster, concrete, cement, wood, pressed boards, pressed metals such as those formed of iron, aluminum, and steel binders, and the like. Impregnation of the surfaces of such articles with the DCP(M)A and the drier or siccative results in the impartation of a hardened, relatively impermeable surface adapted to resist indentation by impact as well as penetration by means of moisture and other liquids such as those mentioned above. Such impregnation results in rendering the objects resistant to the corrosive and degradative effects caused by weathering and subjection to atmospheric smog (resulting from discharges into the air of industrial and internal combustion waste gases, e.g., oxides of sulfur, nitrogen, and carbon, from autos, etc.

Depending on the size of pores existing at the surface of the various articles to be impregnated, the DCP(M)A-containing liquid impregnating composition may include preservatives, e.g., for woods or other materials including small-sized aggregates mentioned in connection with the compositions described hereinabove.

In the following procedures illustrating the invention, the parts and percentages are by weight and the temperatures are in Centigrade unless otherwise stated.

EXAMPLE 1

A polymer concrete (PC) is prepared by mixing 310 parts of 4–8 mesh (U.S. wire screen standard) crushed stone (having an air void volume fraction of 0.52) with 250 parts of 35–100 mesh sand (having an air void volume fraction of 0.43). In the resulting mixture having a coarse/fine weight ratio of 55/45, the air void volume fraction is about 0.28. A workably fluid composition is obtained by mixing the resulting aggregate with about 92 parts of a binder having the following composition:

| Component | Parts |
| --- | --- |
| DCPMA | 102 |
| Rheology agent* | 18 |
| Cobalt naphthenate (6% Co) | 4 |

*A polydicyclopentadiene available under the registered trademark Piccodiene 2215, which has a softening point of 103° C., a specific gravity of 1.10, a bromine No. of 39, an iodine No. of 142, an acid No. of 1.0, a saponification No. of 2.0, and a melt viscosity of 1 poise at 213° C., 10 p. at 170° C., and 100 p. at 142° C.

The resulting mixture is poured into a mold 2 inches deep. The cast composition is substantially cured to solid condition in about 6 hours at room temperature. Essentially complete cure, with tackfree surface, occurs overnight. A tough, water-impermeable casting is obtained. Specific gravity is 2.10 and compressive strength is 5400 psi. (one month cure). The concrete exhibits a weight increase of only ¼% after three weeks immersion in water.

A concrete prepared with the same aggregate mixture but using 172 parts of Portland Cement and 86 parts of water (the minimum needed to yield a workably fluid concrete) as the binder has a specific gravity of 2.30 and a compressive strength of 4400 psi. (one month cure). This resulting concrete exhibits an increase of about 6% by weight after three weeks immersion in water.

EXAMPLE 2

Example 1 is repeated but using the following binder composition:

| Component | Parts |
| --- | --- |
| DCPMA | 78 |
| di(n-butyl)fumarate | 24 |
| Rheology agent of Example 1 | 18 |
| Cobalt naphthenate (6% Co) | 4 |

The mixture is cast as in Example 1. It cures to a substantially solid condition in about 6 hours. Essentially complete cure, with tackfree surface occurs overnight. A tough, water-impermeable casting is obtained. Specific gravity is 2.22 and compressive strength is 5400 psi.

EXAMPLE 3

Example 1 is repeated but using the following binder composition:

| Component | Parts |
| --- | --- |
| DCPMA | 85 |
| Rheology agent of Example 1 | 15 |
| Dimethyl aniline | 1 |
| Cobalt naphthenate (6% Co) | 1 |
| Methacrylic acid | 0.5 |

The mixture is cast as in Example 1. It cures to a substantially solid condition in about one hour at room temperature. Essentially complete cure, with tackfree surface, occurs overnight. A tough, water-impermeable casting is obtained. Specific gravity is 2.11.

EXAMPLE 4

A polymer-containing concrete is prepared by mixing 10 parts of White cement and 310 parts of 4–8 mesh (U.S. wire screen standard) crushed stone (having an air void volume fraction of 0.52) with 250 parts of 35–100 mesh sand (having an air void volume fraction of 0.43). In the resulting mixture having a coarse/fine weight ratio of 55/45, the air void volume fraction is about 0.28. A workably fluid composition is obtained by mixing the resulting aggregate with about 103 parts of a binder having the following composition:

| Component | Parts |
| --- | --- |
| DCPMA | 85 |
| Rheology agent of Example 1 | 15 |
| Dimethyl aniline | 1 |
| Cobalt naphthenate (6% Co) | 1 |
| Methacrylic acid | 0.5 |

The resulting mixture is poured into a mold 2 inches deep. The cast composition is substantially cured to solid condition in about an hour at room temperature. Essentially complete cure, with tackfree surface, occurs overnight. A tough, water-impermeable casting is obtained.

EXAMPLE 5

A cementitious but essentially anhydrous mortar is prepared from a mixture of the sand of Example 1 and Portland cement having a void volume fraction of 0.6 and a particle size range of 1 to 100 microns in a (bulk) volume ratio of 2:1 (weight ratio about 2.64:1) by adding to this sand/cement mixture having a void volume fraction of 0.35, just before use, the following binder is prepared from a mixture of sand of Example 1 and Portland cement having a void volume fraction of 0.6 and a particle size range of 1 to 100 microns in a (bulk) volume ratio of 2:1 (weight ratio about 2.64:1) by adding to this sand/cement mixture having a void volume fraction of 0.35, just before use, the following binder composition:

| Component | | Parts |
| --- | --- | --- |
| DCPMA | | 100 |
| Dimethyl aniline | | 1 |
| Cobalt naphthenate (6% Co) | | 1 |
| Methacrylic acid | | 0.5 |
| | Total | 102.5 |

The amount of binder incorporated is sufficient to render the mixture trowellable, being about 25 parts binder per 100 parts by weight of sand/cement mixture. When applied in a half-inch thickness to a glass test plate, the mortar cures in a few hours to hard, adherent, water-resistant material. Similar results are obtained when the DCPMA is partially or completely replaced with DCPA.

EXAMPLE 6

A concrete slab is impregnated with DCPMA containing dissolved therein 0.06% cobalt as the naphthenate by applying a liberal coating thereof to the surface of the slab and allowing it to soak in for six hours, resulting in a weight gain of about 3% after wiping off the excess DCPMA. Air-curing is then allowed to occur, yielding after about a day a hydrophobic water-impermeable surface having good water-repellency. This procedure is particularly useful for treatment of pavements on bridge decks and on ship decks.

For this purpose, it has heretofore been suggested to impregnate the pavement or floor with a volatile monomer, such as methyl methacrylate, containing a free radical polymerization initiator. Such systems have the disadvantages of high volatility and low flash point, which make working with these systems dangerous to the personnel handling the systems and the impregnant has a short pot life.

The impregnating system of the present invention comprises non-volatile impregnant DCP(M)A, with or without up to 35% by weight of another relatively non-volatile monomer, 0.0005 to 2% by weight drier, and with or without 0.1 to 2% by weight of a volatile stabilizer, e.g., a ketone-oxime or an aldehyde-oxime which inhibits the oxidative action of the drier till the stabilizer is volatilized. The percentages are based on the weight of the impregnating composition. This composition has practical pot life and contains a relatively small amount of volatile material. Specific examples of volatile oximes are methyl ethyl ketone-oxime, methyl butyl ketone-oxime, 5-methyl-3-heptanone-oxime, cyclohexanone-oxime and butyraldehyde-oxime.

We claim:
1. A composition suitable for use as a polymer concrete comprising (a) a granular aggregate having a void fraction of less than 0.37, (b) a liquid selected from dicyclopentenyl acrylate, dicyclopentenyl methacrylate, mixtures thereof, and mixtures of at least one of said (meth)acrylates with up to 40% by weight of another non-volatile monomer, such as a higher alkyl or alkenyl acrylate or methacrylate, and (c) a siccative or drier, the proportion of component (b) being such as to make the composition of workable consistency, and the amount of (c) being from 0.0005 to 2% by weight of component (b).
2. A composition according to claim 1 wherein the aggregate material (a) of the composition comprises (1) a hydraulic cement and (2) other aggregate material, the relative proportions between (1) and (2) being from 1:100 to 10:1, preferably from 1:20 to 3:1.
3. A product obtained from the casting or molding of the composition of claim 1 or 2 in or on a form and air-curing the cast or molded mass.
4. A composition according to claim 1 or 2 which is essentially anhydrous.
5. A composition according to claim 2 which also contains a small amount of water.
6. A product obtained by casting or molding, and subsequently air-curing the cast or molded mass, a composition according to claim 4.
7. A product obtained by casting or molding, and subsequently air-curing the cast or molded mass, a composition according to claim 5.

* * * * *

UNITED STATES PATENT AND TRADEMARK OFFICE
CERTIFICATE OF CORRECTION

PATENT NO. : 4,197,225
DATED : April 8, 1980
INVENTOR(S) : WILLIAM D. EMMONS, ET AL It is certified that error appears in the above-identified patent and that said Letters Patent are hereby corrected as shown below:

Rewrite claim 6 as follows:

--6. (amended) A product obtained by casting or molding a composition according to claim 4, and subsequently air-curing the cast or molded [mass, a composition according to claim 4] composition.--

Rewrite claim 7 as follows:

--7. A product obtained by casting or molding a composition according to claim 5, and subsequently air-curing the cast or molded [mass, a composition according to claim 5] composition.

Signed and Sealed this

Twenty-eighth Day of October 1980

[SEAL]

Attest:

SIDNEY A. DIAMOND

Attesting Officer

Commissioner of Patents and Trademarks